United States Patent [19]

Kimura

[11] Patent Number: 5,778,674
[45] Date of Patent: Jul. 14, 1998

[54] TURBOCHARGED DIESEL ENGINE

[75] Inventor: Shuji Kimura, Yokohama, Japan

[73] Assignee: Nissan Motor Co., Ltd., Kanagawa, Japan

[21] Appl. No.: 636,704

[22] Filed: Apr. 23, 1996

[30] Foreign Application Priority Data

Apr. 25, 1995 [JP] Japan .................... 7-101148

[51] Int. Cl.$^6$ .................... F02B 37/12; F02B 47/08
[52] U.S. Cl. .................... 60/600; 60/602; 60/605.2; 123/506
[58] Field of Search .................... 60/600–603, 605.2, 60/611; 123/564

[56] References Cited

U.S. PATENT DOCUMENTS

| | | | |
|---|---|---|---|
| 4,474,008 | 10/1984 | Sakurai et al. | 60/605.2 |
| 4,594,983 | 6/1986 | Takahashi et al. | 60/602 |
| 5,187,935 | 2/1993 | Akiyama et al. | 60/600 |

FOREIGN PATENT DOCUMENTS

| | | | |
|---|---|---|---|
| 60-36728 | 2/1985 | Japan | 60/602 |
| 62-282137 | 12/1987 | Japan | 60/602 |
| 6-159080 | 6/1994 | Japan | 60/602 |
| 60-162018 | 8/1995 | Japan | |

*Primary Examiner*—Michael Koczo
*Attorney, Agent, or Firm*—Lowe, Price, LeBlanc & Becker

[57] ABSTRACT

In a diesel engine in which boost air is supplied by a turbocharger, the generation of dry soot, which is a component of smoke, is suppressed by lowering the intake air temperature in the cylinder at the compression top dead center position of the piston. The fuel injected into the intake air is ignited by the heat of this compression. In order to reduce the intake air temperature at the top dead center position without reducing the amount of the intake air, the boost pressure of the turbocharger is lowered and also the effective compression ratio by the piston for the intake air is raised by, for example, altering the closing timing of an intake valve.

7 Claims, 10 Drawing Sheets

FIG. I

TURBOCHARGED DIESEL ENGINE

FIELD OF THE INVENTION

This invention relates to control of combustion chamber gas temperature at compression top dead center for a diesel engine which is equipped with a turbocharger.

BACKGROUND OF THE INVENTION

In order to restrain the amount of NOx in the exhaust of a diesel engine, there is known an EGR (Exhaust Gas Recirculation) device which recirculates a portion of the exhaust gas of the engine back into its intake passage. In such an EGR device, the exhaust passage and the intake passage are communicated together via an EGR conduit within which an EGR valve is provided, and the combustion temperature is lowered so as to reduce the amount of NOx by opening this EGR valve so as to mix a predetermined amount of EGR gas into the intake air.

Although the combustion of fuel in a diesel engine is initiated by compression ignition in the vicinity of compression top dead center position of the engine piston, when the intake air temperature rises the combustion chamber gas temperature at compression top dead center (the compression stroke end temperature) also rises. Further, lowering of the oxygen concentration in the intake gas due to EGR brings about a lowering of the excess air ratio at the time of combustion. Both of these trends can cause increase in the amount of dry soot, which is a particulate component of exhaust smoke, contained in the exhaust gas. For this reason, rise in the intake air temperature during EGR can easily generate smoke.

In particular, with a diesel engine which is equipped with a turbocharger which supplies compressed air to the intake passage using a compressor which is connected to an exhaust turbine, it can easily happen that the heat of the turbocharger is transmitted to the intake air and thereby elevates its temperature. Accordingly, increase of smoke is liable to occur when EGR is implemented for an engine which is equipped with a turbocharger.

In relation to smoke reduction, Tokkai Sho 60-162018 published by the Japanese Patent Office in 1985 proposes the provision of a swirl generator which varies the cross sectional area of a helical shaped intake port, so as to cause generation of swirl (rotational eddying) of the intake air in the combustion chamber. The generation of smoke is reduced when the mixing together of air and fuel is promoted by such swirl.

However, when the amount of EGR is considerably increased in an engine which is equipped with a turbocharger, for instance as a response to the strengthening of regulations regarding the permissible amounts of emitted NOx, then it becomes difficult to keep the emission of smoke at a desirable level only by generating swirl in order to promote the mixing together of the air and the fuel.

SUMMARY OF THE INVENTION

It is therefore an object of this invention to provide an effective means for reduction of smoke for an engine which is equipped with a turbocharger.

It is a further object of this invention to control the compression stroke end temperature, which can become a cause of the generation of smoke.

In order to achieve the above objects, this invention provides a diesel engine comprising a cylinder, a turbocharger which supplies intake air to the cylinder at a boost pressure, a piston which compresses intake air in the cylinder with an effective compression ratio by reciprocating between a bottom dead center position and a top dead center position thereof for igniting fuel supplied to the cylinder by the heat of compression of the compressed intake air. The engine further comprises a mechanism for calculating a compressed intake air temperature in the cylinder at said top dead center position, a mechanism for lowering the boost pressure of the turbocharger when the compressed intake air temperature has exceeded a predetermined temperature, and a mechanism for increasing the effective compression ratio when the compressed intake air temperature has exceeded the predetermined temperature.

It is preferable that the engine further comprises a mechanism for detecting a rotational speed of the engine, a mechanism for detecting an amount of air supplied to the cylinder, a mechanism for detecting an amount of fuel supplied to the cylinder, and a mechanism for detecting a temperature of air to be supplied to the cylinder, wherein the calculating mechanism calculates the compressed intake air temperature based upon the engine rotational speed, the amount of air supplied to the cylinder, the amount of fuel supplied to the cylinder, and the temperature of air to be supplied to the cylinder.

It is also preferable that the intake air is supplied to the cylinder via an intake valve, and the increasing mechanism comprises a mechanism for altering a closing timing of the intake valve to the vicinity of the bottom dead center position.

It is also preferable that the engine further comprises an exhaust manifold, wherein the turbocharger comprises an exhaust turbine interposed in the exhaust passage and a compressor which is driven by the exhaust turbine, and wherein the lowering mechanism comprises a variable vane for altering an inlet cross sectional area of the exhaust turbine.

It is also preferable that the lowering mechanism comprises a bypass conduit which bypasses the exhaust turbine and a waste gate which opens and closes the bypass conduit.

It is also preferable that the engine further comprises an air intake conduit via which the boost air is supplied to the cylinder, wherein the lowering mechanism comprises a throttle provided within the intake conduit for controlling the amount of air supplied to the cylinder and a mechanism for reducing an opening of the throttle when a lowering of the boost pressure by the lowering mechanism does not reach a predetermined pressure.

It is also preferable that the engine further comprises an exhaust gas recirculation mechanism for recirculating a portion of an exhaust gas of the engine to the cylinder, and a mechanism for controlling a timing of the supply of fuel according to a rate of exhaust gas recirculation via the exhaust gas recirculation mechanism.

The details as well as other features and advantages of this invention are set forth in the remainder of the specification and are shown in the accompanying drawings.

DESCRIPTION OF THE PREFERRED EMBODIMENTS

Figure 1:
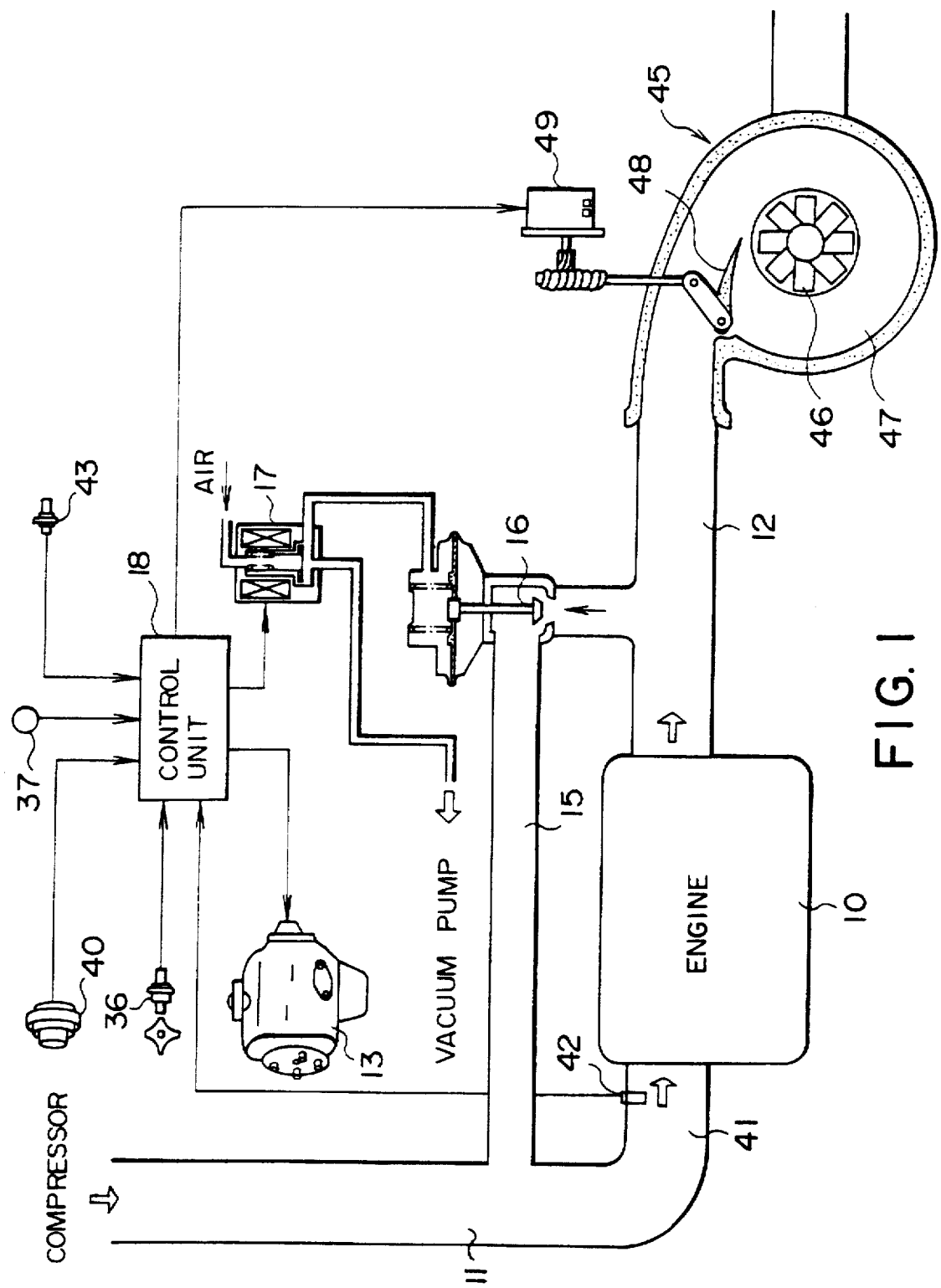
FIG. 1 is a schematic diagram of a diesel engine according to a first embodiment of this invention.

Referring to FIG. 1 of the drawings, an intake passage 11 and an exhaust passage 12 are connected to an engine 10. Fuel which is to be combusted by the engine 10 is supplied by a fuel injection pump 13. This fuel injection pump 13 is of a per se known type in which the amount of injected fuel and the timing of fuel injection are electronically controlled; it varies the starting timing for injection of fuel according to the closing timing of an electromagnetic valve which is not shown in the figures, while it varies the amount of injected fuel according to the time period in which this electromagnetic valve remains closed.

A diaphragm type EGR valve 16 is provided partway along an EGR conduit 15 which communicates the exhaust passage 12 to the intake passage 11. The opening amount of this EGR valve 16 is varied according to the vacuum supplied thereto from a vacuum pump via a vacuum control valve 17. The opening amount of the vacuum control valve 17 is controlled by a control unit 18.

Figure 4:
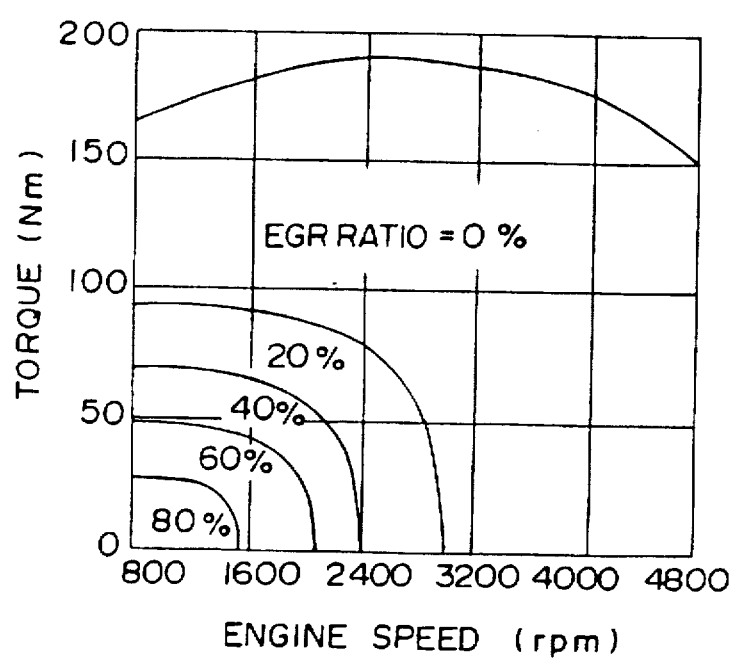
FIG. 4 is a graph of EGR ratio characteristics, according to the first embodiment of this invention.

In order to perform this control, an EGR ratio map shown in FIG. 4 is stored in the control unit 18. The EGR ratio is defined as the ratio of the amount of EGR to the amount of fresh intake air. According to this map, a maximum EGR ratio of 80% pertains to the low revolution speed low load engine operational region. In a region where the engine revolution speed and the engine load are somewhat greater, the EGR ratio is 60%. The EGR ratio is reduced as the engine revolution speed increases and as the engine load increases. Since in the high load region the exhaust temperature is elevated, the temperature of the intake gas will be raised if a large quantity of exhaust gas is recirculated. As a result, the efficiency of NOx reduction will be deteriorated, and the ignition delay time period from the injection of fuel until the time point of ignition will be shortened, and it will become impossible to implement previously-mixed fuel combustion.

The control unit 18, based upon the signals input to it, controls the vacuum level of the EGR valve 16 via the vacuum control valve 17, so as to obtain the EGR ratio prescribed in FIG. 4.

Further, the control unit 18 controls the timing for fuel injection.

Figure 5:
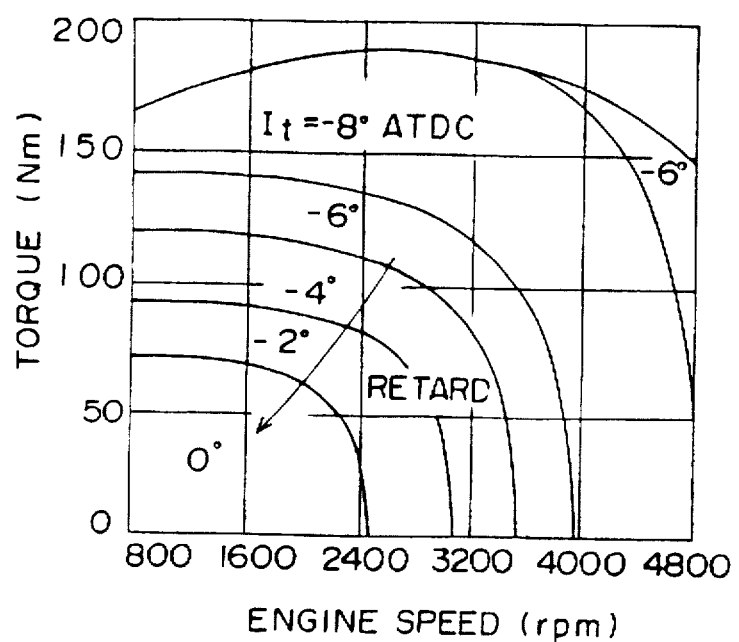
FIG. 5 is a graph of fuel injection timing characteristics, according to the first embodiment of this invention.

In order to do this, a fuel injection timing map as shown in FIG. 5 is stored in the control unit 18. According to this map, the fuel injection timing is delayed in such a manner that, the higher is the EGR ratio for the current engine operational region, the longer is the injected fuel ignition timing delay; and, in the low rotational speed low load region in which the EGR ratio is high, the fuel injection timing is set to piston top dead center (TDC). By this delay, the temperature in the combustion chamber at the time point of ignition is lowered, and the generation of smoke in the high EGR region is suppressed by increasing the proportion of previously-mixed fuel combustion.

According to this map, the fuel injection timing angle is advanced as the rotational speed of the engine and the load become greater. Even if it is provisionally hypothesized that the ignition timing delay is fixed in terms of time, the ignition delay crank angle increases in proportion to increase in the engine revolution speed. Accordingly, in the high rotational speed high load region where the EGR ratio is low, it is necessary to advance the fuel injection timing in order to obtain ignition at the most desirable timing.

The control unit 18 controls the closing timing of the electromagnetic valve of the fuel injection pump 13 in order to obtain the injection timing shown in FIG. 5. Further, it controls the time period over which this valve remains closed, so as to obtain a fuel injection amount based upon the depression amount of the accelerator pedal, the engine rotational speed, etc.

The control unit 18 also controls the closing timing of the intake valves of the engine.

Figure 2:
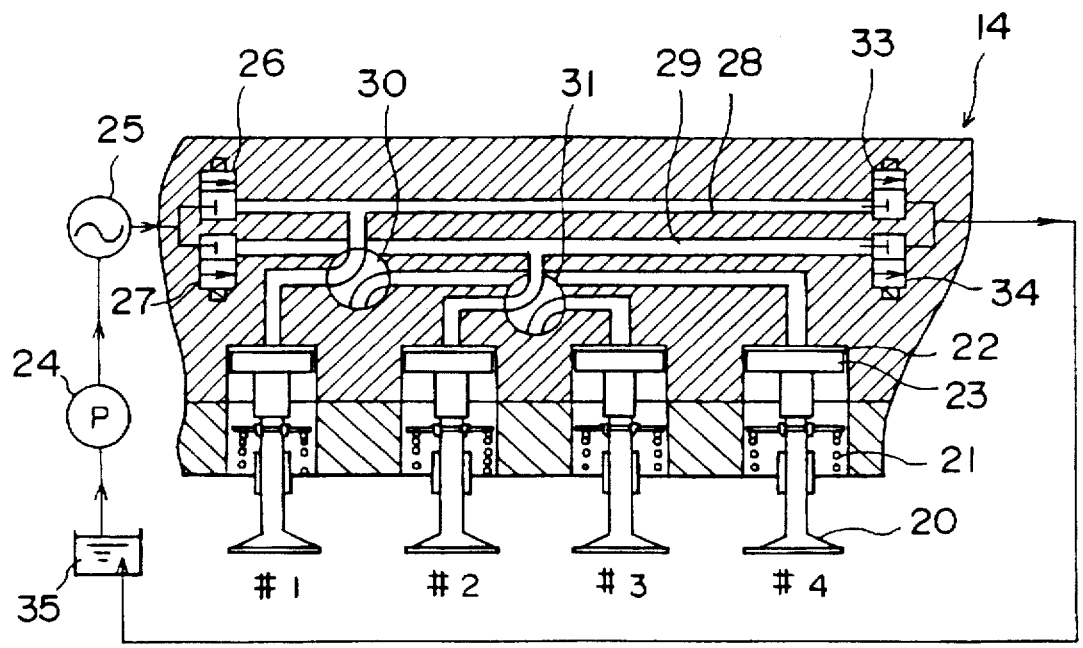
FIG. 2 is a vertical sectional view of an intake valve timing alteration mechanism, according to the first embodiment of this invention.

The construction of an intake valve timing alteration mechanism 14 for doing this is shown in FIG. 2. Each of the intake valves 20 is biased in its closing direction by a corresponding valve spring 21. In contact with the upper end of each of the valves 20 there is provided a corresponding piston 23. Above each of these pistons 23 there is defined a hydraulic chamber 22. Supply of hydraulic fluid pressure to each of these hydraulic fluid chambers 22 pushes its corresponding piston 23 downwards, so as to open the corresponding intake valve 20 against the resistance of its valve spring 21.

Driving hydraulic fluid pressurized by a hydraulic pump 24 is selectively supplied from an accumulator 25 to hydraulic conduits 28 and 29 via input side electromagnetic switchover valves 26 and 27, and thence is selectively supplied via rotary valves 30 and 31, which rotate together with the rotation of the engine crankshaft, to each of the hydraulic chambers 22 for the #1 cylinder, the #4 cylinder, the #2 cylinder, and the #3 cylinder in turn. By doing this, the intake valves 20 are opened in the appropriate sequence.

The hydraulic pressure in each of the hydraulic chambers 22 is selectively vented to a tank 35 via output side electromagnetic switchover valves 33 and 34, and by doing this the intake valves 20 are closed in the appropriate sequence.

Figure 7:
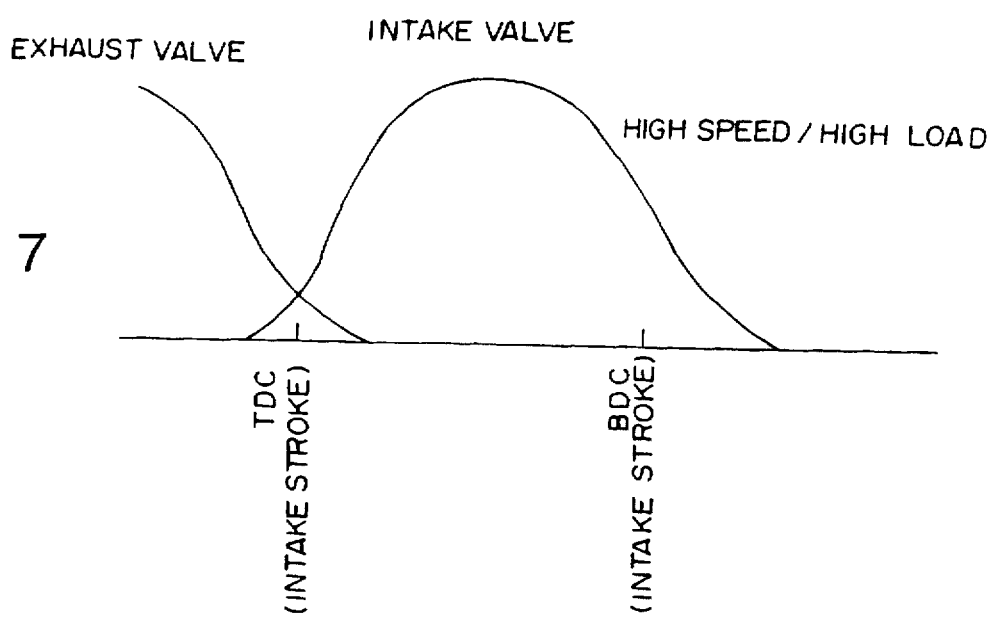
FIG. 7 is similar to FIG. 6, but showing the characteristics when compression stroke end temperature is elevated.

The control unit 18, as shown in FIG. 7, controls the output side electromagnetic switchover valves 33 and 34 so as normally to keep the closing time point of each of the intake valves 20 delayed later than the bottom dead center (BDC) of its corresponding piston.

Figure 6:
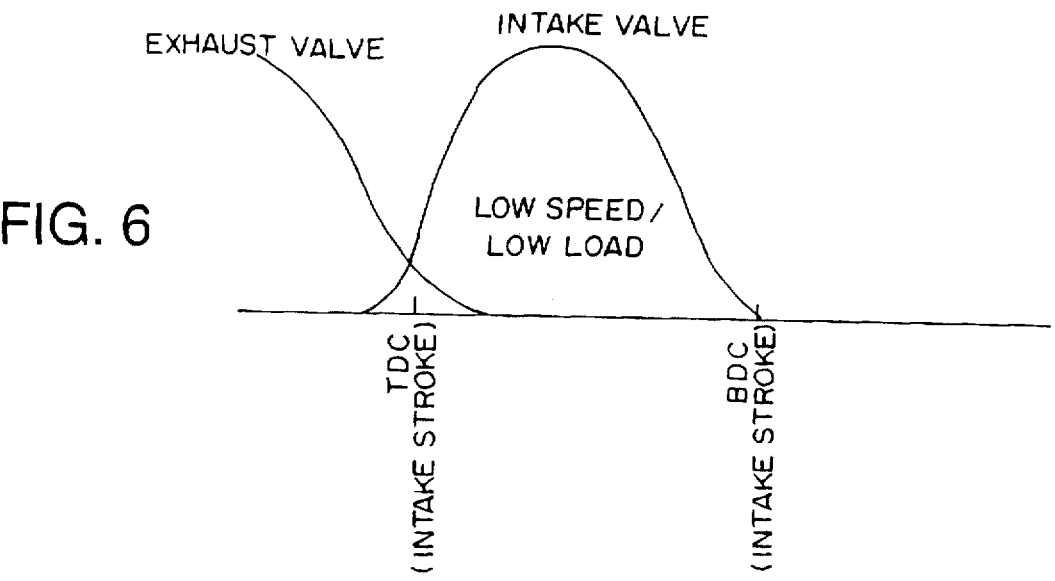
FIG. 6 is a diagram showing normal intake valve opening and closing characteristics, according to the first embodiment of this invention.

Further, as shown in FIG. 6, in certain conditions which will be explained hereinafter, the control unit 18 controls these output side electromagnetic switchover valves 33 and 34 so as to bring their closing time points to the vicinity of their piston bottom dead centers.

The normal closing time points for the intake valves 20 are determined so as to obtain high air charging efficiency at high engine rotational speed. When these closing time points are advanced to near piston bottom dead center, the effective compression ratio is elevated, and also the amount of intake air is increased, since the starting time points of compression are advanced.

The opening time points for the intake valves 20 are controlled via the input side electromagnetic switchover valves 26 and 27 so as to be kept at almost the same timings, as shown in FIGS. 6 and 7.

As shown in FIG. 1, an exhaust turbine 46 of a turbocharger 45 is interposed in the exhaust passage 12 of the engine 10 downstream of the point therein at which the EGR conduit 15 branches off therefrom. Further, an air intake compressor of the turbocharger 45 is interposed in the intake passage 11.

A variable vane 48 is fitted in a scroll inlet in a housing 47 of the exhaust turbine 46. A stepping motor 49 which drives this variable vane 48 is controlled by the control unit 18.

In order to obtain a predetermined supplementary pressure in the low engine rotational speed region, the control unit 18 increases the flow rate of exhaust gas which enters the exhaust turbine 46 by driving the variable vane 48 via the stepping motor 49 so as to hold it at an inclined position. Further, in the high rotational speed region, the control unit 18 positions the vane 48 to its fully open position, so as to allow exhaust gas to enter into the exhaust turbine 46 without any substantial resistance. Moreover, in certain conditions, the variable vane 48 is controlled to such an angle as to reduce the supplementary pressure.

Figure 3:
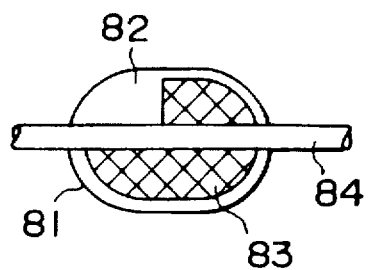
FIG. 3 is a plan view of a swirl valve, according to the first embodiment of this invention.

In each branch passage 81 of an intake manifold 41 of the engine 10 towards each of its intake ports, there is interposed a swirl valve 83 which is provided with a specific cutaway portion 82, as shown in FIG. 3.

When this swirl valve 83 is closed, the intake air only enters into the combustion chamber of the engine 10 only via the cutaway portion 82. For this reason, the speed of the air flow which is inhaled into the combustion chamber is increased, and thereby swirl is generated in the combustion chamber.

With an engine which has two intake valves for each of its cylinders, it is also possible to generate swirl in the low engine rotational speed low load region by keeping one of these intake valves closed.

In order to perform the various control methods described above, to the control unit 18 there are input the output signals from: a rotational speed sensor 36 which detects the rotational speed of the engine and the crank angle thereof; an accelerator opening amount sensor 37 which detects the amount of depression of the accelerator pedal, which represents engine load; an air flow sensor 40 which detects the flow rate of intake air through the intake passage 11; an intake air temperature sensor 42 which detects the temperature of the air in the intake manifold 41; and an oxygen concentration sensor 43 which detects the concentration of oxygen in the exhaust gas in the exhaust passage 12.

Figure 8:
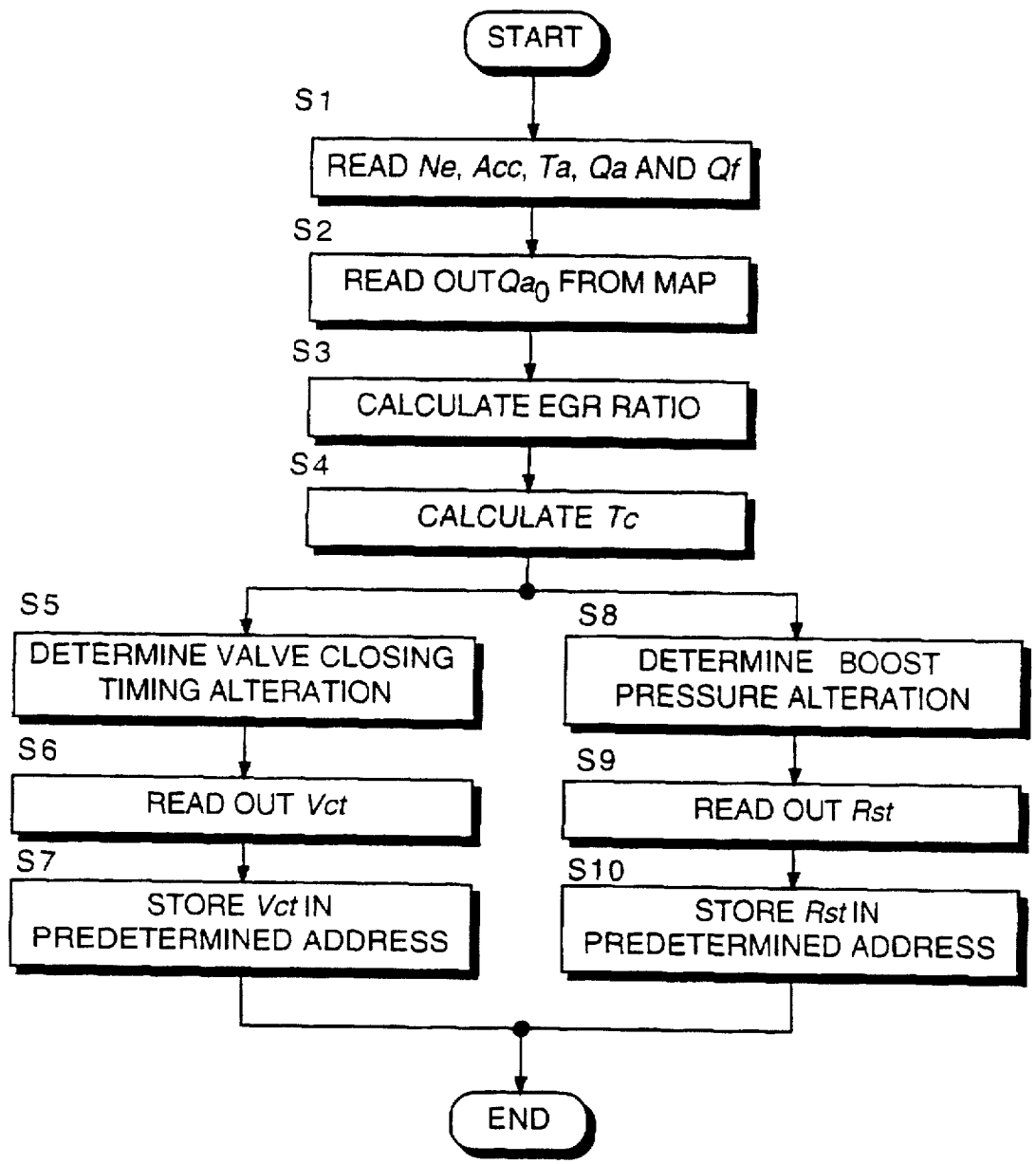
FIG. 8 is a flow chart showing a control process for the closing timing of intake valves and for the boost pressure of a turbocharger, according to the first embodiment of this invention.

Next, with reference to the flow chart shown in FIG. 8, the procedure executed by the control unit 18 for controlling the compression stroke end temperature, i.e. the temperature in the combustion chambers at compression top dead center, will be explained.

In the step S1, the engine rotational speed Ne, the accelerator opening amount Acc, the intake air flow amount Qa, the intake air temperature Ta, the fuel injection amount Qf, and the oxygen concentration in the exhaust gas are read in.

In the step S2, the intake air flow amount $Qa_0$ when the EGR ratio was 0% is read out from a map. This map determines $Qa_0$ as a function of engine rotational speed Ne and accelerator opening amount Acc, and is stored in the control unit 18 in advance.

In the step S3, the EGR ratio is calculated from this value $Qa_0$ and the intake air flow amount Qa, according to the following equation:

$$EGR\ rate = \left(\frac{Qa_0 - Qa}{Qa_0}\right) \times 100\%$$

In the step S4, the compression stroke end temperature Tc is calculated by the following per se known method.

First, a map that is established in terms of the gas composition of the intake air (which is obtained from the EGR ratio and the oxygen concentration in the exhaust gas) and the engine rotational speed Ne is looked up, and the ratio of specific heats $\kappa$ is read out.

Next, the compression ratio $\epsilon$ is calculated from the closing timing of the intake valves 20. This compression ratio $\epsilon$ is the ratio of the volume of the cylinder at the time point at which its intake valve closes to its volume at compression top dead center.

Then the compression stroke end temperature Tc is calculated from this specific heat ratio $\kappa$ and the compression ratio $\epsilon$ which have been obtained, by using the following equation:

$$Tc = Ta \cdot \epsilon^{\kappa-1}$$

Figure 9:
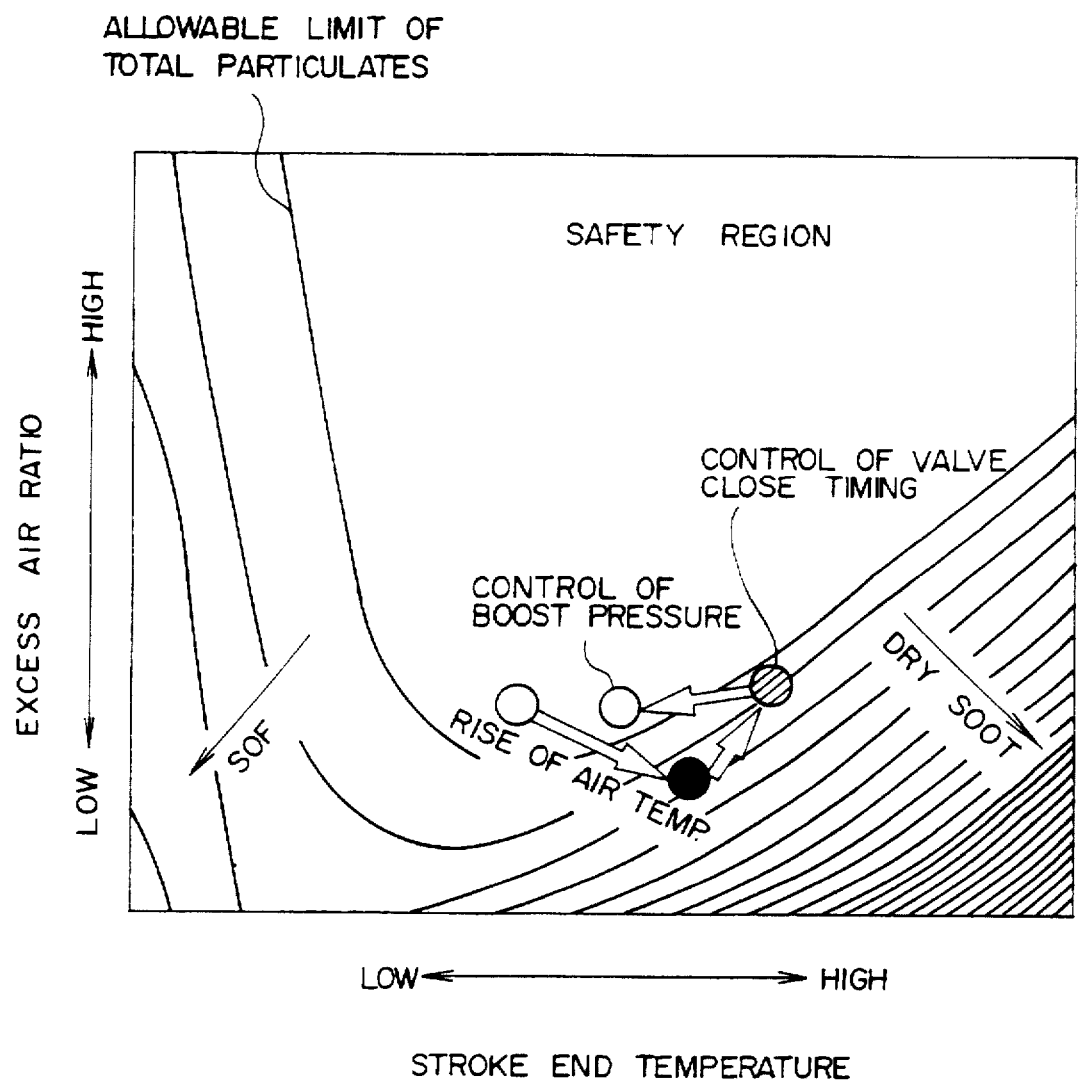
FIG. 9 is a graph showing a relation between the compression stroke end temperature and excess air ratio for the same amount of particulates, according to the first embodiment of this invention.

Next, a decision is made as to whether or not this compression stroke end temperature Tc lies within the safe region shown in the FIG. 9 diagram. The air excess ratio in the diagram is obtained from the intake air flow amount Qa and the fuel injection amount Qf.

The steps S5 through S7 and steps S8 through S10, shown in the following, are executed in parallel.

In the step S5, based upon whether or not this compression stroke end temperature Tc lies within the safe region shown in the FIG. 9 diagram, it is determined whether or not to change the closing timing for the intake valves 20. And, in the event that the compression stroke end temperature Tc is higher than the safe region, the closing timing of the intake valves 20 is set to the vicinity of piston bottom dead center, as shown in FIG. 6.

In the steps S6 and S7, the opening timing of the output side electromagnetic switchover valves 33 and 34 of the timing alteration mechanism 14, which corresponds to the set closing timing, is stored in a predetermined address. By opening the output side electromagnetic switchover valves 33 and 34 with this opening timing, the intake valves 20 are closed according to the set closing timing.

In the other parallel branch to this one, in the step S8, based upon whether or not the above described compression stroke end temperature Tc lies within the safe region shown in the FIG. 9 diagram, it is determined whether or not to lower the boost pressure of the turbocharger 45. In other words, if the compression stroke end temperature Tc is higher than the safe region, the variable vane 48 is rotated to a position which lowers the boost pressure.

In the steps S9 and S10, the angular position of the stepping motor 49, which corresponds to the new rotational position of the variable vane 48, is stored in a predetermined address. By rotating the stepping motor 49 to this angular position, the supplementary pressure is lowered.

In this manner, if the calculated temperature Tc exceeds a predetermined value, on the one hand the closing timing of the intake valves 20 is advanced so that the effective compression ratio is raised, while on the other hand, since the boost pressure of the turbocharger 45 is lowered by operating the variable vane 48, it is thereby possible to lower the intake air temperature without reducing the intake air amount. When the compression ratio is raised, the intake air temperature rises due to the heat of compression, but a portion of this heat of compression is absorbed by the cooling system of the engine. On the other hand, the high temperature of the turbocharger 45 is transmitted to the intake air by the air supplementation process. In this case, since the specific heat of the gas varies according to the pressure, the amount of heat received from the turbocharger 45 varies according to the boost pressure, and is greater the higher the boost pressure is; this amount of heat must be added to the heat of compression. Accordingly, the temperature rise of the intake air is larger when it is compressed by the turbocharger 45 than in the case when it is compressed in the cylinder. That is to say, if the intake air pressure at the end of the compression stroke is the same, the temperature of the intake air at the end of compression is reduced by increasing the proportion of compression in the cylinder, and by lowering the proportion of compression by the tubocharger.

For example, under the assumption that the above described processes for advancing the closing timing of the intake valves and for lowering the supplementary pressure are not performed, let the compression ratio be termed $\epsilon_0$, the supplementary pressure be termed $Pi_0$, the temperature at the start of the compression stroke be termed $Ti_0$, and the gas temperature at the end of the compression stroke be termed $Tc_0 (= Ti_0 \cdot \epsilon_0^{\kappa-1})$.

On the other hand, under the assumption that the above described processes are performed, let the compression ratio be termed $\epsilon(>\epsilon_0)$, the supplementary pressure be termed $Pi(>Pi_0)$, the temperature at the start of the compression stroke be termed Ti, and the gas temperature at the end of the compression stroke be termed $Tc(=Ti \cdot \epsilon^{\kappa-1})$.

Here, suppose that the supplementary pressure Pi is lower than the supplementary pressure $Pi_0$ only in correspondence to the amount of increase of the intake air amount due to increase of the compression ratio. Under this assumption, the compression stroke end temperatures in both cases are given by the following equations:

$$\frac{Ti}{Ti_0} = \left(\frac{Pi_0}{Pi}\right)^{\frac{k-1}{k}} \propto \left(\frac{\epsilon_0}{\epsilon}\right)^{\frac{k-1}{k}} = \left(\frac{\epsilon_0}{\epsilon}\right)^{0.42}$$

where, compression efficiency=70%

$$\frac{Tc}{Tc_0} = \left(\frac{Ti}{Ti_0}\right) \cdot \left(\frac{\epsilon}{\epsilon_0}\right)^{\kappa-1} \propto \left(\frac{\epsilon_0}{\epsilon}\right)^{0.42}$$

$$\left(\frac{\epsilon}{\epsilon_0}\right)^{0.3} = \left(\frac{\epsilon_0}{\epsilon}\right)^{0.12} < 1 \therefore Tc < Tc_0$$

where, $\kappa \approx 1.3$

Figure 10:
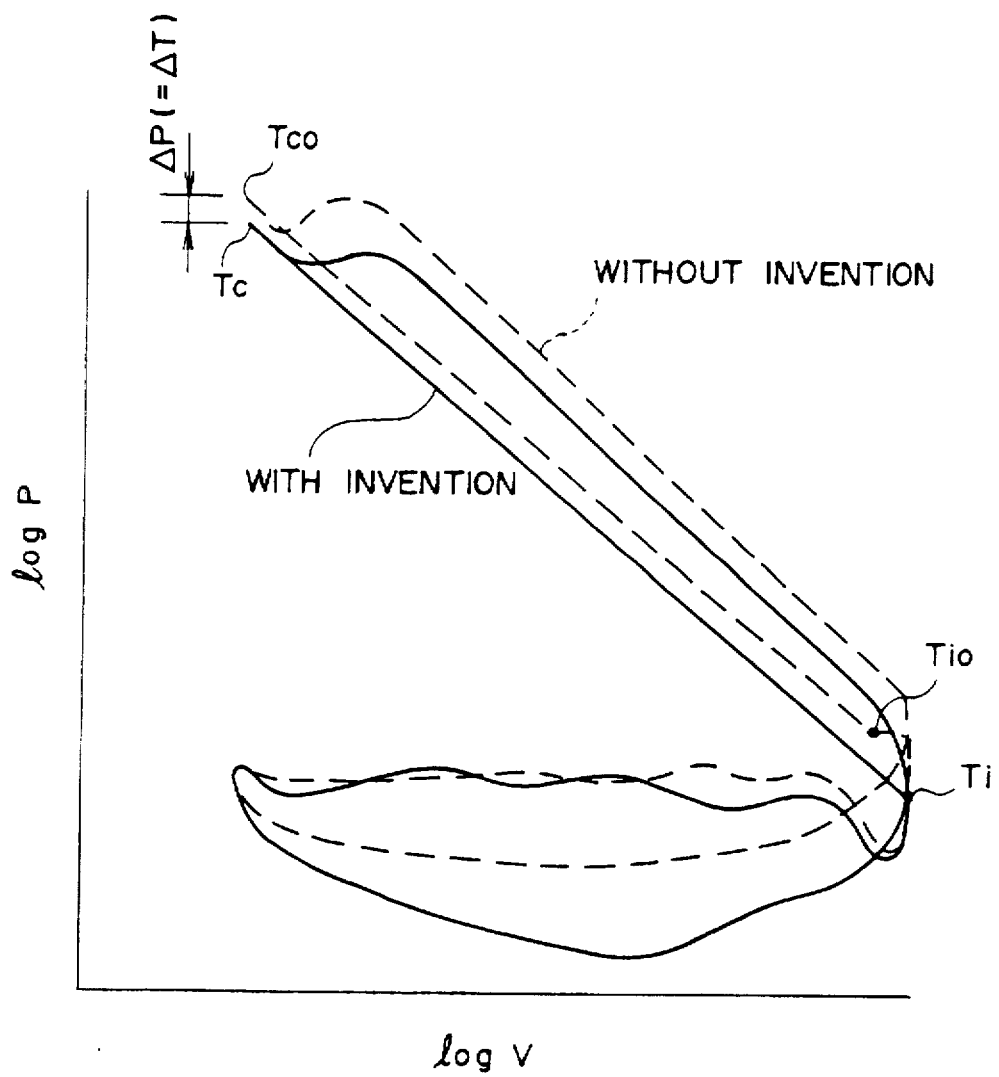
FIG. 10 is an indicator diagram for the diesel engine, according to the first embodiment of this invention.

Accordingly, the compression stroke end temperature is lowered, with the actual amount of intake air constant as shown in FIG. 10, by the performance of the above described processes for advancing the closing timing of the intake valves and for lowering the supplementary pressure.

As a result, as shown in FIG. 9, if the compression stroke end temperature has undesirably risen as far as the dry soot region (for example due to rise of the external air temperature), then, by advancing the closing timing of the intake valves 20 and by also reducing the supplementary pressure, the compression stroke end temperature can be lowered as far as the safety region in which very little dry soot is generated.

Figure 11:
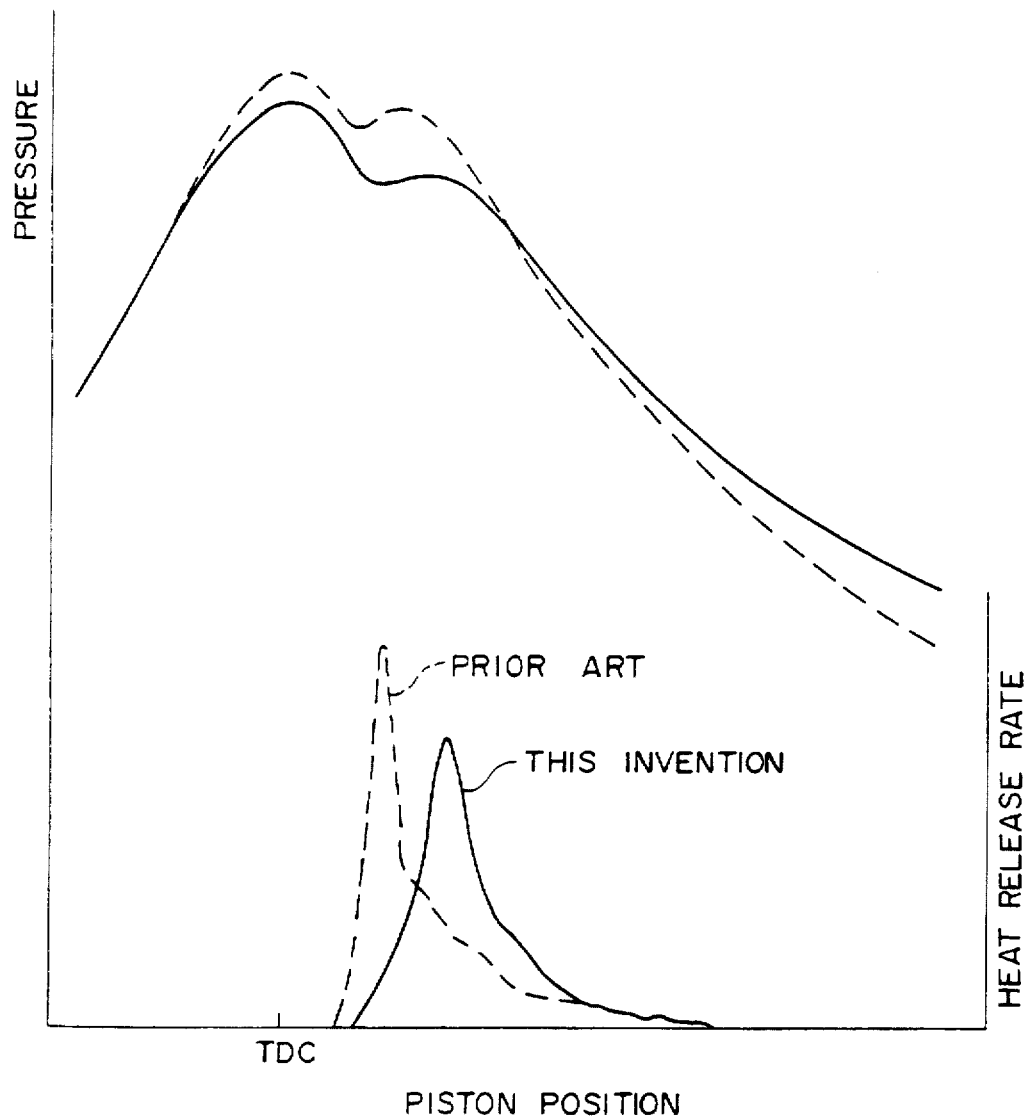
FIG. 11 is a diagram showing a relation between piston position and pressure and heat release rate, according to the first embodiment of this invention.

By doing this, the ignition delay period from fuel injection until ignition becomes longer, and as shown in FIG. 11 the heat generation pattern has the form of an isosceles triangle, which indicates previously-mixed fuel combustion. Accordingly, it is possible to prevent increase of the amount of dry soot generated due to rise of the intake air temperature.

In this embodiment the intake air temperature is lowered by lowering the turbocharger supplementary pressure, but it would also be possible to lower the intake air temperature by cooling the intake air, or to lower the intake air pressure by restricting the intake air as described hereinafter.

Figure 12:
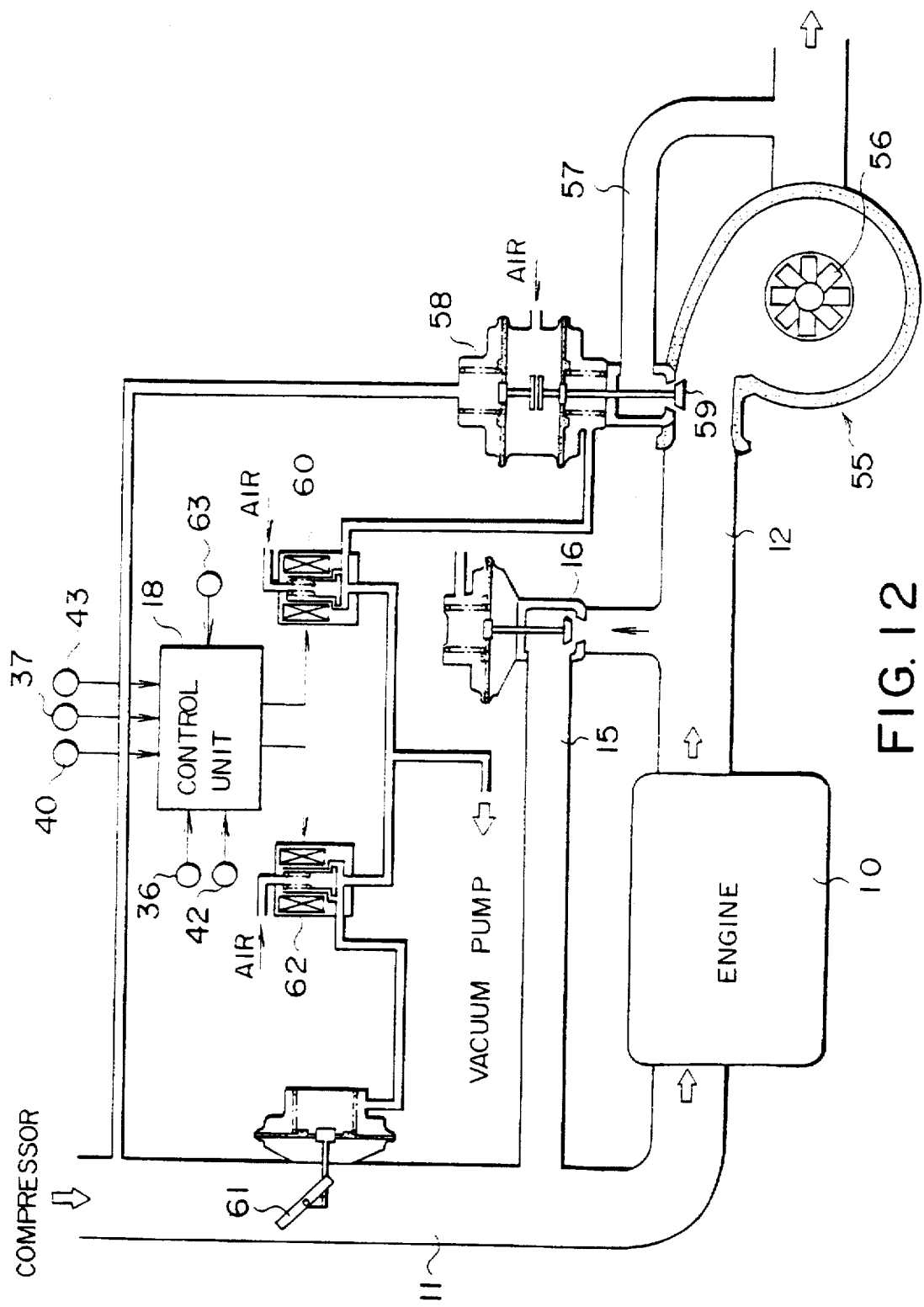
FIG. 12 is similar to FIG. 1, but showing a second embodiment of this invention.

FIG. 12 shows another embodiment of this invention which is related to a means for lowering the supplementary pressure.

In this embodiment, a bypass conduit 57 is provided which bypasses the exhaust gas turbine 56 of the turbocharger 55, and the flow rate through this bypass conduit 57 is controlled by an exhaust gas waste gate 59 which is connected to an actuator 58. The boost pressure is supplied to the actuator 58 from the intake air compressor of the turbocharger 55, while vacuum is supplied from a vacuum source via a vacuum control valve 60. The former fulfills the role of a relief mechanism for preventing rise of the boost pressure above a predetermined value therefor. The latter is controlled by the control unit 18, and opens the waste gate 59 by vacuum.

A diaphragm type air throttle valve 61 is provided in the intake passage 11 upstream of the point thereof where the EGR conduit 15 is joined thereto. This air throttle valve 61 is driven in its closing direction by vacuum which is supplied from the vacuum source via a vacuum control valve 62.

When the compression stroke end temperature has risen above the safe region shown in FIG. 9, the control unit 18 lowers the boost pressure of the turbocharger by opening the exhaust gas waste gate 59 by using the vacuum control valve 60 and the actuator 58.

Further, if the boost pressure is not sufficiently reduced just by the opening of the exhaust gas waste gate 59, the air throttle valve 61 is closed to a predetermined position via the vacuum control valve 62, according to the output signal from a boost pressure sensor 63 which detects the boost pressure.

The control of EGR, the control of fuel injection amount, the control of injection timing, and the intake valve closing timing control based upon the compression stroke end temperature, are the same as in the first embodiment described above.

In the case of control of the boost pressure by this exhaust gas waste gate 59, although depending upon operational conditions of the engine it may happen that the boost pressure is low and even if the exhaust gas waste gate 59 is opened the compression stroke end temperature does not drop, nevertheless in this case the intake air pressure is lowered by closing the air throttle valve 61 as far as its predetermined position and thus reducing the intake air flow rate to a predetermined amount.

Such a turbocharger 55 with the waste gate 59 is cheaper than the turbocharger 45 with variable vane 48 of the first embodiment.

Accordingly, although this invention has been shown and described in terms of the preferred embodiment thereof, it is not to be considered as limited by any of the perhaps quite fortuitous details of said embodiment, or of the drawings, but only by the terms of the appended claims, which follow.

I claim:

1. A diesel engine, comprising:

a cylinder;

a turbocharger which supplies intake air to said cylinder at a boost pressure;

a piston which compresses intake air in said cylinder with an effective compression ratio by reciprocating between a bottom dead center position and a top dead center position thereof, fuel supplied to said cylinder being ignited by the heat of compression of said compressed intake air;

means for calculating a compressed intake air temperature in said cylinder at said top dead center position;

means for lowering said boost pressure of said turbocharger, when said compressed intake air temperature has exceeded a predetermined temperature; and means for increasing said effective compression ratio, when said compressed intake air temperature has exceeded said predetermined temperature.

2. A diesel engine according to claim 1, further comprising means for detecting a rotational speed of said engine, means for detecting an amount of air supplied to said cylinder, means for detecting an amount of fuel supplied to said cylinder, and means for detecting a temperature of air to be supplied to said cylinder; wherein said calculating means calculates said compressed intake air temperature based upon said engine rotational speed, said amount of air supplied to said cylinder, said amount of fuel supplied to said cylinder, and said temperature of air to be supplied to said cylinder.

3. A diesel engine according to claim 1, wherein said intake air is supplied to said cylinder via an intake valve, and said increasing means comprises a mechanism for altering a closing timing of said intake valve to the vicinity of said bottom dead center position.

4. A diesel engine according to claim 1, further comprising an exhaust manifold, wherein said turbocharger comprises an exhaust turbine interposed in said exhaust passage and a compressor which is driven by said exhaust turbine, and wherein said lowering means comprises a variable vane for altering an inlet cross sectional area of said exhaust turbine.

5. A diesel engine according to claim 1, wherein said lowering means comprises a bypass conduit which bypasses said exhaust turbine and a waste gate which opens and closes said bypass conduit.

6. A diesel engine according to claim 1, further comprising an air intake conduit via which said boost air is supplied to said cylinder, wherein said lowering means comprises a throttle provided within said intake conduit for controlling the amount of air supplied to said cylinder and means for reducing an opening of said throttle when a lowering of said boost pressure by said lowering means does not reach a predetermined pressure.

7. A diesel engine according to claim 1, further comprising an exhaust gas recirculation mechanism for recirculating a portion of an exhaust gas of said engine to said cylinder, and means for controlling a timing of said supply of fuel according to a rate of exhaust gas recirculation via said exhaust gas recirculation mechanism.

* * * * *